United States Patent [19]
Lutz

[11] Patent Number: 6,099,415
[45] Date of Patent: Aug. 8, 2000

[54] ULTRAVIOLET RADIATION CURABLE INKS FOR GAME BALLS, GOLF BALLS AND THE LIKE

[75] Inventor: Mitchell E. Lutz, Fairhaven, Mass.

[73] Assignee: Acushnet Company, Fairhaven, Mass.

[21] Appl. No.: 09/038,256

[22] Filed: Mar. 10, 1998

Related U.S. Application Data

[62] Division of application No. 08/807,502, Feb. 27, 1997, Pat. No. 6,013,330.
[51] Int. Cl.$^7$ ................ C08F 2/50; B05D 3/06; C09D 11/10
[52] U.S. Cl. ................ 473/357; 522/40; 522/44; 522/46; 522/34; 522/71; 522/75; 522/79; 522/80; 522/81; 522/96; 522/103; 522/121; 522/142; 522/182; 522/42; 473/378; 106/22 R
[58] Field of Search ................ 522/75, 81, 34, 522/40, 44, 42, 46, 79, 71, 182, 96, 103, 121, 142; 473/378, 351; 428/914; 106/22 R

[56] References Cited

U.S. PATENT DOCUMENTS

| | | | |
|---|---|---|---|
| H304 | 7/1987 | Vorrier et al. | 522/92 |
| 3,781,214 | 12/1973 | Nemoto et al. | 260/22 |
| 3,803,109 | 4/1974 | Nemoto et al. | 260/89.1 |
| 4,164,423 | 8/1979 | Schumacher | 106/20 |
| 4,264,483 | 4/1981 | Laufer et al. | 260/23 |
| 4,271,258 | 6/1981 | Watariguchi | 430/284 |
| 4,486,033 | 12/1984 | Parrotta | 283/94 |
| 4,670,295 | 6/1987 | Quinn et al. | 427/54.1 |
| 4,680,368 | 7/1987 | Nakamoto et al. | 528/49 |
| 4,751,102 | 6/1988 | Adair et al. | 427/53.1 |
| 4,776,270 | 10/1988 | Kumamoto | 101/35 |
| 4,856,670 | 8/1989 | Hang et al. | 220/2.1 |
| 4,875,410 | 10/1989 | Lee et al. | 101/170 |
| 4,978,969 | 12/1990 | Chieng | 346/1.1 |
| 5,093,038 | 3/1992 | Durand | 252/514 |
| 5,160,836 | 11/1992 | Harris et al. | 106/19 R |
| 5,166,186 | 11/1992 | Kojime et al. | 522/37 |
| 5,275,646 | 1/1994 | Marshall et al. | 106/20 B |
| 5,391,685 | 2/1995 | Hitomi et al. | 528/75 |
| 5,770,325 | 6/1998 | Keller et al. | 428/914 |
| 5,827,134 | 10/1998 | Sullivan et al. | 473/372 |
| 5,885,173 | 3/1999 | Keller et al. | 473/385 |

FOREIGN PATENT DOCUMENTS

| | | |
|---|---|---|
| 0 106 628 B1 | 1/1987 | European Pat. Off. . |
| 59-174667 | 10/1984 | Japan . |
| 60-025756 | 2/1985 | Japan . |
| 60-141584 | 7/1985 | Japan . |
| 6145580 | 5/1994 | Japan . |
| 2022116 | 12/1979 | United Kingdom . |
| 2211791 | 7/1989 | United Kingdom . |
| 2256874 | 12/1992 | United Kingdom . |
| WO 94/13749 | 6/1994 | WIPO . |

OTHER PUBLICATIONS

Automated Industrial Systems, Inc., 21H Series UV Ink Data Bulletin.
Automated Industrial Systems, Inc., 21A–400 UV Curable Inks, Material Safety Data Sheet.
Automated Industrial Systems, Inc., 21A–400 Ink, Product Bulletin.
Perma–Mark, 21A Series U.V. Ink, Ink & Chemical Data Sheet.
Automated Industrial Systems, Inc., 21H Series UV Ink, Material Safety Data Sheet.
Carl Verbanic, "Radiation Curing Consolidates Its Grains", Chemical Business, Mar. 1993, pp. 13–18.
Padprint, a Trans Tech America Inc. Publication, vol. VI, Issue 1, Spring–Summer 1994, p. 7.
Trans Tech America Inc. flyer entitled "Transfer Pad Printing Ink Type UVA (Ultraiolet Curable)", Rev. Dec. 1994.
Trans Tech America Inc. flyer entitle "Transfer Pad Printing Ink Type Printing Ink Type UVB (Ulraviolet Curable)", Rev. Jun. 1994.
Trans Tech America Inc. Material Safety Data Sheet; Prduct Name: UV Curable Pad Printing Ink; Sep. 28, 1994.
Trans Tech America Inc. Material Safety Data Sheet; Product Name: UV Curable Pad Printing Ink; Nov. 3, 1993.
UVEXS Ultraviolet Exposure Systems Material Safety Data Sheet; Product Name: 304–43 Series—UV Curable Pad Printing Inks; Apr. 19, 1994.

*Primary Examiner*—Susan W. Berman
*Attorney, Agent, or Firm*—Pennie & Edmonds LLP

[57] ABSTRACT

Ultraviolet radiation curing of inks on game balls, golf balls and the like is disclosed. Production inks, logo inks and methods for forming production prints and logos on golf balls, game balls and the like are disclosed. To form an ultraviolet radiation curable water-insoluble production ink, at least an adhesion promoting component is added to an ink base. The adhesion promoting component is selected from the group consisting of a carboxylic acid functional monomer, a carboxylic acid functional oligomer, an ester functional monomer, an ester functional oligomer and mixtures thereof, the adhesion promoting component having at least one adhesion promoting functional moiety comprising at least about 2 moles of a carbonyl functionality per mole of the adhesion promoting component and being sufficient to maintain adhesion of the production ink of at least about 75% of the inked surface to the topcoat and to the surface of the game ball or the golf ball after ultraviolet radiation curing and after coating the production ink with the topcoat. To form an ultraviolet radiation curable water-insoluble logo ink, at least a toughening agent is added to an ink base. The toughening agent is sufficient to maintain adhesion of the logo ink to the topcoat of at least about 75% of the inked surface after ultraviolet radiation curing.

28 Claims, 4 Drawing Sheets

ULTRAVIOLET RADIATION CURABLE INKS FOR GAME BALLS, GOLF BALLS AND THE LIKE

CROSS REFERENCE TO RELATED APPLICATIONS

This is a divisional application of prior application Ser. No. 08/807,502, filed on Feb. 27, 1997, now U.S. Pat. No. 6,013,330.

FIELD OF THE INVENTION

The present invention is directed to ultraviolet radiation curing of ultraviolet (UV) curable inks applied to curved surfaces including spherical surfaces. More particularly, the invention is directed to UV curable inks and their application to and curing upon game balls, golf balls and the like. These inks are preferentially applied as single or multiple, clear or color layers for forming logos or production prints on game balls including golf balls.

BACKGROUND OF THE INVENTION

It is often desirable to apply clear, pigmented or dyed ink coatings or layers to form distinctive logos or production prints on game balls (e.g., golf balls, ping pong balls, billiard balls, baseballs, basketballs, racquet balls, handballs, etc.). Various commercially available inks are commonly used for this purpose.

To clarify the difference between logo printing and production printing, a brief description of these processes as they are applied to game balls such as golf balls (e.g., having curved surfaces) is provided below. Golf balls are commonly one-piece, two-piece or three-piece constructions. One-piece balls are made from a homogeneous polymer shaped into a golf ball. Two-piece golf balls comprise an inner core and an outer surrounding polymeric shell. Three-piece golf balls comprise various combinations of a core (wound or unwound), one or more intermediate polymeric shells and an outer polymeric cover. The cover polymer used in two-piece and three-piece balls may, for example, be balata, an ionomeric polymer (e.g., SURLYN®) or a polyurethane.

Golf ball covers are commonly painted with a primer coat which may be colored (e.g., white) or transparent. Alternately, the cover itself may contain a colorant. Typically, a tough, often glossy, topcoat is applied over the cover and/or the primer coat to form a protective outer seal on the golf ball. The topcoat may comprise, for example, a two component urethane. The topcoat typically increases the shine (i.e., glossy appearance) of the golf ball to enhance or brighten its appearance.

As used herein, "production printing" refers to a process wherein ink is applied directly to the cover or to the primer coat and the ink is then further coated with a topcoat. The image produced thereby is a "production" print and the ink used for this purpose is a "production" ink. In production printing, for some applications, when ink is applied directly to a cover, the cover surface is first roughened, for example, by sandblasting to enhance the bond between the ink and the cover. Thereafter, the ink is applied to the roughened cover. A transparent water based or solvent based overcoat may be applied over the ink layer and on the roughened cover to smooth out the cover and ink surfaces. Examples of such overcoats include urethane, polyester and acrylic. Thereafter, a topcoat is preferably applied to the overcoat.

Alternatively, "logo printing" as also used herein, involves the application of the ink directly onto a topcoat. The image produced thereby is a "logo" and the ink is a logo (or custom) ink. Thus, by use of production and/or logo printing one may add decorative markings such as a company trademark, symbol or the like to increase brand recognition and/or to enhance the appearance and/or the visibility of golf balls, game balls and the like. As used herein, the term "ball" is used to refer to game balls, golf balls and the like.

Most commonly, logos and production prints are applied to golf balls by a pad printing process and apparatus. Pad printing uses an etched image plate (i.e., a cliche) having a negative etching of the desired image. The image plate, typically, is made of a tough material such as metal, steel, other alloy or photopolymer which normally has a uniform thickness except for the area defining the negative etched image. The plate may optionally be coated with one or more protectant layers or materials, to enhance its useful life. Typically, the depth of the etched image is from about 5 microns to about 30 microns or any value therebetween.

During pad printing, ink is applied to the image plate, thus filling the etched image. Excess ink is then scraped off of the image plate, leaving behind ink only within the etched image. A printing pad is then momentarily lowered and pressed onto the inked image plate to lift ink off of the etched ink filled cavity onto the printing pad. The ink so lifted defines the shape of the etched image. The inked pad is then momentarily lowered and pressed onto, for example, a golf ball, thereby releasing the ink from the pad to the golf ball. The ink released from the pad forms, on the spherical surface of the ball, an image corresponding to that of the etched cavity.

This process of inking the image plate, scraping off excess ink, lifting off ink onto the printing pad and releasing the ink from the pad to the object (e.g., golf ball) to be inked may be repeated to print a plurality of images on a plurality of types of balls with various inks having desirable ink properties. The process of pad printing is well known. See, for example, U.S. Pat. No. 5,513,567 (Froh et al.); U.S. Pat. No. 4,896,598 (Leech, Jr.); U.S. Pat. No. 4,803,922 (Denesen); U.S. Pat. No. 4,745,857 (Putnam et al.); and U.S. Pat. No. 5,237,922 (Ho).

Printing pads are made from a resilient material such as silicone rubber which desirably picks up ink from the etched cavity of the image plate during lift-off and releases all of the ink lifted off when brought into contact with the article to be printed. Once the ink is deposited, it is cured, most commonly by a thermal curing process.

However, during manufacturing of printed articles such as game balls and golf balls, ink transfer problems are often encountered. For example, while it is desirable that all of the ink picked up by the printing pad be fully released onto the article to be printed, sometimes complete release is not achieved. Consequently, subsequent articles to be printed upon by the same printing pad member may have excessive ink or misaligned ink deposited thereon. Such improper ink deposition leads to unwanted ink contamination of balls, either directly between balls or indirectly by first transferring ink to ball handling equipment or both. Resolution of such problems requires expensive positioning equipment to prevent unwanted contact between balls, between ink depositing members and balls and between ball handling equipment and balls, respectively.

To overcome such ink transfer problems, intermediate thermal curing steps are introduced into the manufacturing process. There are several disadvantages to thermal curing, however. These include (1) high energy consumption, (2)

long cooling cycles, (3) restricted material selection to thermally curable and thermally stable polymeric materials and (4) use of costly ventilating systems to dissipate vapors generated during thermal curing.

In addition to the problems associated with ink transfer before the ink is cured, post manufacturing problems are also commonly encountered even after curing takes place. Ink layers, after cure, may not possess a desirable level of adhesion to a substrate article surface. For example, a logo printed onto a golf ball topcoat is subjected to repeated "hard" impacts by a golf club during the golf ball's normal useful life. If adhesion, toughness, flexibility and/or hardness are at an undesirable level, ink deposited upon a topcoat (e.g., a logo printed upon a finished ball having an underlying topcoat or a clear coat) and/or ink deposited under a topcoat (e.g., a production print formed by the ink layer being interposed between the cover or primer coat and an overcoat and/or a topcoat) will abrade, flake, crack or otherwise separate from the golf ball topcoat, overcoat, the cover and/or the primer coat. After repeated impacts, such lack of adhesion, toughness, flexibility and/or hardness yields an unsightly golf ball.

To overcome these and other drawbacks, inks used in production and logo printing must have sufficient durability. Durability is influenced by such factors as ink layer flexibility (i.e., ink layer brittleness), ink layer resistance to abrasion, ink layer hardness, adhesion to golf ball cover polymers such as ionomers (e.g., SURLYN®), balata, polyurethane, polyolefin mixtures thereof, adhesion to topcoats, adhesion to primer coats and intercoat adhesion between various layers of inks and/or other overcoats and/or topcoats.

To overcome these and other problems, novel inks (1) that are low energy curable, (2) that require minimal cooling, if any, (3) that are almost instantaneously cured, and (4) that permit the use of a broader range of polymeric core, intermediate shell (or windings) or cover materials for use with golf balls and game balls are sought. These requirements are met by ultraviolet radiation curable inks which are the subject of the present invention.

SUMMARY OF THE INVENTION

It is therefore an object of the present invention to provide a novel, cost-effective and rapid ultraviolet radiation curing method for forming an ink print on a curved surface such as that found on a game ball, a golf ball or the like.

It is another object of the present invention to provide a method of forming a logo or production print on such a game ball, golf ball, etc. curved surface with improved durability, flexibility, hardness, etc., by the use of ultraviolet radiation curing.

It is a further object of the present invention to provide UV curable ink compositions having improved durability, flexibility, hardness, abrasion resistance, adhesion and ink transfer properties.

It is another object of the present invention to provide a UV curable ink composition suitable for production printing on game balls, golf balls and the like (e.g., sports equipment such as club heads, helmets etc., and other curved surfaces) having improved durability, flexibility, hardness, abrasion resistance, adhesion and ink transfer properties.

It is a still further object of the present invention to provide a UV curable ink composition suitable for logo printing on game balls, golf balls and the like having improved durability, flexibility, hardness, abrasion resistance, adhesion and/or ink transfer properties.

These and other objects are accomplished by the use of a novel, cost-effective and rapid method of curing ink layers on the curved surfaces of game balls, golf balls or the like using ultraviolet curing radiation. In one embodiment of the invention, ultraviolet radiation curable water-insoluble inks are deposited on, e.g., a golf ball to produce a logo or a production print, which is thereafter cured by application of ultraviolet curing radiation.

In another embodiment, the invention comprises an ultraviolet radiation curable water-insoluble production ink for forming an inked surface on at least a portion of the surface of a game ball, golf ball or the like wherein at least the inked surface is coated with a topcoat. The ink comprises an ink base containing a prepolymer with at least two prepolymer functional moieties and a photoinitiator. The prepolymer is selected from the group consisting of a first acrylate, an ester and mixtures thereof and a polymerizable monomer.

Added to the production ink base is an adhesion promoting component which may be a carboxylic acid functional monomer, a carboxylic acid functional oligomer, an ester functional monomer, an ester functional oligomer or mixtures thereof. The adhesion promoting component has at least one adhesion promoting functional moiety comprising at least about 2 moles of a carbonyl functionality per mole of the adhesion promoting component. It is sufficient to maintain adhesion of at least about 75% of the curved inked surface to the topcoat and to the surface of the game ball, golf ball or the like after curing and after coating with the topcoat.

A further embodiment is directed to a process for forming a production print on at least a portion of the curved surface of a game ball, golf ball or the like. For example, with golf balls as an example, the process comprises providing a golf ball having a curved surface; coating at least a portion of the golf ball surface with at least a layer of an ultraviolet curable water-insoluble production ink; curing the coating layer with ultraviolet radiation; and coating at least the inked surface with a topcoat.

An additional embodiment of the present invention is directed to an improved ultraviolet radiation curable water-insoluble logo ink composition. The water-insoluble logo ink includes an ink base comprising a prepolymer having at least two prepolymer functional moieties and a photoinitiator. The prepolymer is selected from the group consisting of a first acrylate, an ester and mixtures thereof and at least a polymerizable monomer.

Included in the logo ink base is a toughening agent. The toughening agent is sufficient to maintain adhesion of the logo ink to the topcoat of at least about 75% of the inked surface after ultraviolet radiation curing. The toughening agent may be sterically hindered monomers, dimers, trimers or oligomers, such as sterically hindered acrylates. Preferably, the toughening agents are also reactive diluents, (i.e., they form covalent bonds upon polymerization and are incorporated into the structure of the ink layer).

A still further embodiment involves a process for forming a logo on a game ball or golf ball topcoat. For example, in the case of a golf ball, the process comprises providing a golf ball having a topcoated surface; coating at least a portion of the surface with at least a layer of an ultraviolet curable water-insoluble logo ink; and curing the ink with ultraviolet radiation.

While the present invention is described mainly in terms of a golf ball, it should be understood that a variety of additional curved substrates (e.g., game balls) may be printed upon using the ink formulations and methods described and claimed herein without departing from the scope of the present invention.

DETAILED DESCRIPTION OF THE PREFERRED EMBODIMENTS

Figure 1:
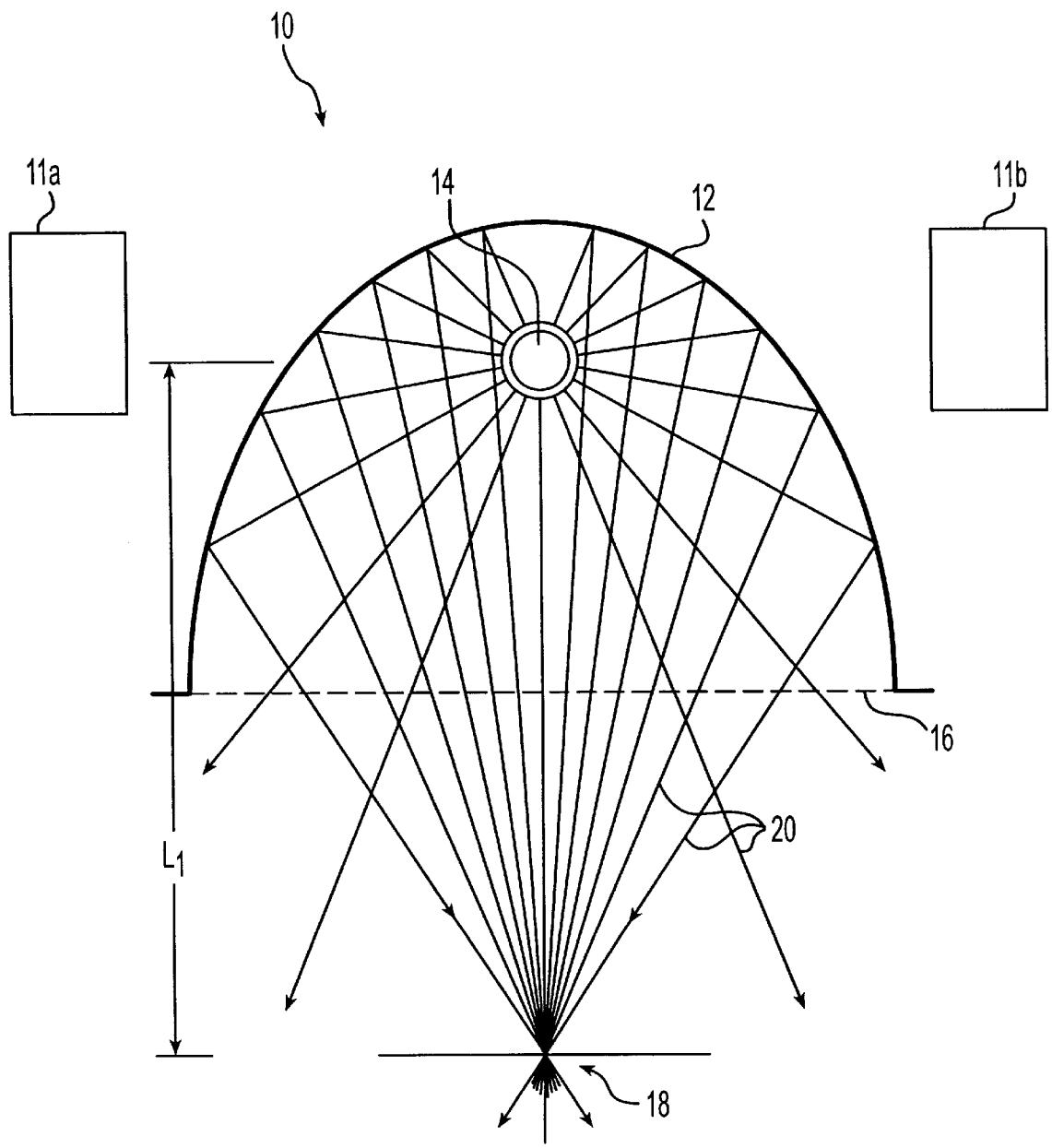
FIG. 1 is a schematic cross-sectional drawing of an exemplary ultraviolet radiation source.

The following detailed description is provided to aid those skilled in the art in practicing the present invention. However, it should not be construed to unduly limit the scope of the present invention. Variations and modifications in the embodiments discussed may be made by those of ordinary skill in the art without departing from the invention.

The ultraviolet radiation curable water-insoluble production ink of the present invention is formed by modifying a base composition to incorporate at least an adhesion promoting component. The ink base composition comprises a prepolymer having at least two prepolymer functional moieties and a photoinitiator. The prepolymer is selected from the group consisting of a first acrylate, an ester and mixtures thereof and at least a polymerizable monomer.

Suitable first acrylates for use in conjunction with the present invention include, but are not limited to, acrylated amines, acrylic acrylates, oil acrylates, melamine acrylates, heterocyclic acrylates, epoxy acrylates, epoxy acrylates of bisphenol A, epoxy acrylates of bisphenol F, epoxy acrylates of bisphenol S, novolak acrylates, urethane acrylates, ether acrylates, polyether acrylates, thiol acrylates, thioether acrylates, polythioether acrylates, silicon acrylates, polystyryl acrylates, ester acrylates, polyester acrylates, aromatic acrylates, aliphatic acrylates, half-ester acrylates, di-ester acrylates, vinyl acrylates, polybutadiene acrylates, allyl acrylates, polyene acrylates, methacrylates, methacrylated amine, acrylic methacrylates, methacrylic methacrylates, oil methacrylates, melamine methacrylates, heterocyclic methacrylates, epoxy methacrylates of bisphenol A, epoxy methacrylates of bisphenol F, epoxy methacrylates of bisphenol S, novolak methacrylates, urethane methacrylates, ether methacrylates, polyether methacrylates, thiol methacrylates, thioether methacrylates, polythioether methacrylates, silicon methacrylates, polystyryl methacrylates, ester methacrylates, polyester methacrylates, aromatic methacrylates, aliphatic methacrylates, half-ester methacrylates, di-ester methacrylates, vinyl methacrylates, polybutadiene methacrylates, allyl acrylates, polyene methacrylates and the like and mixtures thereof.

The first acrylates are acrylated prepolymers having high molecular weights, for example, of at least about 500 grams per mole and have at least 2 polymerizable functionalities (i.e., prepolymer moieties) per molecule of prepolymer. Often, the acrylated prepolymers and the ester prepolymers have a high viscosity (e.g., 100–20,000 centipoise at 25° C.) and a molecular weight from about 500 to about 5,000 grams per mole and from about 2 to 6 reactive prepolymer functional moieties per molecule. The ester may be an unsaturated ester.

The polymerizable monomers are considered reactive diluents. They may be monofunctional monomers or polyfunctional monomers. These polymerizable monomers are used to modify (e.g., typically to reduce) the viscosity of the acrylate prepolymer or the ester prepolymer. However, these monomers primarily aid in the cross-linking of the prepolymers upon ultraviolet radiation curing thereof.

Ultraviolet radiation curing is described below in detail. These monomers include, but are not limited to, one or more monofunctional acrylates or one or more polyfunctional acrylates. For example, the monofunctional acrylates have one acryloyl or methacryloyl group per acrylate molecule whereas the polyfunctional acrylates have two or more acryloyl or methacryloyl groups per acrylate molecule.

Theoretically, upon exposure to UV radiation, it is conceivably possible to cure (i.e., polymerize) a polymerizable ink without a photoinitiator. In practice, however, a photoinitiator is required to achieve an economically feasible cure rate (i.e., increased cure rate). Increased cure rates yield higher production rates and lower per unit production costs of various inked articles such as game balls, golf balls and the like.

Examples of photoinitiators compatible with the ink base of the present invention (e.g., ink base for production ink or ink base for logo ink) include free radical photoinitiators. (See Jean-Pierre Fouassier, *Photoinitiators and Photosensitizers of Polymerization: A Short Review,* Vol. 6, European Coatings Journal, pp. 412–419 (1996). Specific examples of free radical photoinitiators include, but are not limited to, oligo(2-hydroxy-2-methyl-1-(4-(1-methylvinyl)phenyl) propanone), 2-hydroxy-2-methyl-1-phenyl-1-propanone, 2,4,6-trimethylbenzophenone, 4-methylbenzophenone, 2,2-dimethoxy-1,2-diphenylethanone, 2-butoxy-1,2-diphenylethanone, 2-(2-methyl propoxy)-1,2-diphenylethanone, benzophenone, 2-alpha hydroxy ketone, other alpha hydroxy ketones, other benzophenone derivatives or mixtures thereof.

Other photoinitiators (i.e., photo-polymerization initiators) compatible and suitable for use with the inks of the present invention are well known in the art. Additional examples of suitable photoinitiators are listed in U.S. Pat. No. 4,670,295 (Quinn et al.) and U.S. Pat. No. 4,680,368 (Nakamoto et al.), which are incorporated herein by reference in their entirety.

A preferred photoinitiator is Esacure™ KIP-100F that is commercially available from Sartomer. This photoinitiator (Esacure™ KIP-100F) is a liquid mixture of 70% by weight of oligo(2-hydroxy-2-methyl-1-(4-(1-methylvinyl)phenyl) propanone with a M.W.=204.7 grams/mole per repeating unit and 30% by weight of 2-hydroxy-2-methyl-1-phenyl-1-propanone with a M.W.=164.2 grams/mole. This commercially available photoinitiator is a highly reactive, non-yellowing initiator for the polymerization of UV curable inks. It is further characterized by the following physical properties:

| | |
|---|---|
| Appearance | Clear, slightly yellow viscous liquid |
| Odor | Faint, characteristic |
| Solubility | Insoluble in water, soluble in most common organic solvents, monomers, prepolymers. Compatible with resins. |
| Boiling Point | >200° C. |
| Flash Point | 110° C. (Closed cup-Pensky-Martens) |
| Density | 1.1 g/cm$^3$ at 20° C. |
| Viscosity | 15–30 Pa · s. (Brookfield 20 rpm 20° C.) |
| CAS No. | 7473-98-5 |

In accordance with the present invention, the photoinitiator is added to the ink base in an amount sufficient to increase the cure rate of a UV curable ink. However, photoinitiators are extremely expensive. Therefore, it is preferable to use a minimum amount of photoinitiator without unduly sacrificing cure rates, production rates or production costs. For example, the photoinitiator is present from about 0.05% to about 15% by weight of the total weight of the ink. However, it is preferred to use from about 0.05% to about 5% of the photoinitiator, more preferably, from about 0.1% to about 0.5% by weight. For example, 0.1% of Esacure™ KIP-100F is sufficient to formulate an UV curable production ink or logo ink according to the present invention.

Other suitable commercially available photoinitiators include, but are not limited to, 1-hydroxy cyclohexyl phenyl ketone (Irgacure™ 184); $n^5$-2,4 -cyclopentadien-1-yl) ((1,2, 3,4,5,6-n)-(1-methyl ethyl)benzene)-iron (+)-hexafluorophosphate (−1) (Irgacure™ 261); 2-benzyl-2-n-dimethylamino-1-(4-morpholinophenyl)-1-butanone (Irgacure™ 369); 1-hydroxycyclohexyl phenyl ketone (50% by weight) plus benzophenone (50% by weight) (Irgacure™ 500); bis(2,6-dimethoxy benzoyl)-2,4,4 trimethylpentyl phosphineoxide (DMBAPO) (25% by weight) plus 2-hydroxy-2-methyl-1-phenyl-propan-1-one (HMMP) (75% by weight) (Irgacure™ 1700); 4-(2-hydroxyethoxy) phenyl-(2-hydroxy propyl)ketone (Irgacure™ 2959); 2,4,6-Trimethyl benzoyl diphenyl phosphineoxide (TPO) (50% by weight) plus 2-hydroxy-2-methyl-1-phenyl-propan-1-one (HMPP) (50% by weight) (Darocur™ 4265); 2,2-dimethoxy-2-phenylacetophenone (BDK) (Irgacure™ 651); bis($n^5$-2,4-cyclopentadien-1-yl), bis (2,6-difluoro-3-(1H-pyrrol-1-yl)phenyl) Titanium (CGI-784); 2-methyl-1-(4-(methylthio)phenyl)-2-morpholino propan-1-one (MMMP) (Irgacure™ 907); 2-hydroxy-2-methyl-1-phenyl-propan-1-one (HMPP) (Darocur™ 1173); or mixtures thereof. These photoinitiators are commercially available from Ciba-Geigy.

In addition, an adhesion promoting component is added, as noted above, to the ink base to yield a production ink. The adhesion promoting component improves the adhesion of the production ink to, for example, a golf ball cover or a primer coat when applied thereto and after being cured by ultraviolet radiation. The adhesion promoting component also improves the adhesion of the ink to a topcoat (e.g., a urethane topcoat) or to an overcoat (e.g., a water based urethane coat or a solvent based coat) when such coats are applied over the cured production ink.

The adhesion promoting component is selected from among carboxylic acid functional monomers, carboxylic acid functional oligomers, ester functional monomers, ester functional oligomers and mixtures thereof. The adhesion promoting component has at least one adhesion promoting functional moiety comprising at least about 2 moles of a carbonyl functionality per mole of the adhesion promoting component. The adhesion promoting component is added to the ink base to promote intercoat adhesion of the production ink. Intercoat adhesion, as used herein, is defined as adhesion to an underlying cover and/or primer coat and adhesion to an overlying topcoat and/or overcoat.

Preferably, the adhesion promoting component is selected from acrylate oligomers, aromatic acid acrylate esters, aromatic acid acrylate half esters, aromatic acid methacrylate esters, aromatic acid methacrylate half esters and mixtures thereof. The adhesion promoting component has at least about 2 moles of a carbonyl functionality, typically from about 3 to about 12 moles of a carbonyl functionality per mole of the adhesion promoting component or any value therebetween. Preferably, the adhesion promoting component has from about 3.5 to about 11 moles of a carbonyl functionality per mole of the adhesion promoting component. Further, the adhesion promoting component has a molecular weight of about 1,000,000 grams per mole or less, typically from about 100 grams per mole to about 1,000,000 grams per mole.

The carbonyl functionality of the adhesion promoting component can be a carboxylic acid functional moiety, an ester functional moiety, an anhydride functional moiety or a mixture thereof. Preferably, the adhesion promoting functional moiety is a carboxylic acid having, for example, an acid number of at least about 100. The acid number is defined as the quantity of base, expressed in milligrams of potassium hydroxide, that is required to neutralize the free acids present in one gram (1 gm) of the adhesion promoting component the production ink, logo ink, etc. The acid number of the adhesion promoting component is about 300 or less, typically from about 100 to about 300 or any number therebetween. Preferably the acid number is from about 150 to about 250 and most preferably from about 200 to about 230.

Further, the adhesion promoting component is present in an amount of at least about 1% by weight of the total weight of the production ink. All weight percentages provided below are relative to the total weight of the ink containing a given component unless specifically indicated otherwise. The adhesion promoting component is present in an amount of about 75% by weight or less, typically from about 1% to about 60% or any value therebetween (e.g., 10–20%) and, most preferably, from about 5% to about 25% by weight.

Examples of suitable adhesion promoting components include products from SARTOMER Company, Inc. (Exton, Pa.) designated as SARBOX™ SB-501, SARBOX™ SB-401, SARBOX™ SB-510E35 and SARBOX™ SB-520E35. SB-501 is a highly functional, carboxylic acid terminated oligomer blended in 40% by weight (of the total weight of SB-501) of ethoxylated trimethylolpropane triacrylate monomer (designed as SR-454). SB-501 is further characterized as indicated below:

| | |
|---|---|
| Color, APHA | 100–200 |
| Weight/gallon (lbs./gal.) | 9.7–9.9 |
| Viscosity (cps) | |
| 25° C. | 200,000+ |
| 40° C. | 75,000–90,000 |
| 60° C. | 8,000–15,000 |
| 80° C. | 2,500–4,000 |
| Acid Number (mg KOH/gm) based on SARBOX ™ Resin Content | 130–180 |
| SARBOX ™ Resin Content (%) | 60.0 ± 2.0 |
| Flash Point (° F., Setaflash) | 200. |

SB-401 is a highly functional, carboxylic acid terminated, solid oligomer dissolved in 30% by weight (of the total weight of SB-401) of solvent. SB-401 is further characterized as indicated below:

| | |
|---|---|
| Color, APHA | 150–250 |
| Weight/gallon (lbs./gal.) | 9.3–9.6 |
| Viscosity (cps) | |
| 25° C. | 40,000–60,000 |
| 40° C. | 10,000–20,000 |
| 60° C. | 2,000–4,000 |

| Acid Number (mg KOH/gm) based on SARBOX ™ Resin Content | 130–160 |
| SARBOX ™ Resin Content (non-volatile content, %) | 68.0 ± 2.0 |
| Flash Point (° F., PMCC, Solvent) | 136. |

SB-510E35 is a 35% by weight (of the total weight of SB-510E35) moderately functional carboxylic acid containing methacrylate oligomer (i.e., aromatic acid methacrylate half ester resin) blended in 65% by weight (of the total weight of SB-510E35) of ethoxylated trimethylolpropane triacrylate monomer (designated as SR-454, the chemical structure of which is incorporated herein by reference). SB-510E35 is further characterized as indicated below:

| Color, APHA | 150–250 |
| Weight/Gallon (lbs/gal.) | 9.70–9.90 |
| Viscosity (cps) | |
| 25° C. | 80,000–120,000 |
| 40° C. | 40,000–60,000 |
| 60° C. | 3,500–7,000 |
| Acid Number (mg KOH/gm) based on SARBOX ™ Resin Content | 200–230 |
| SARBOX ™ Resin Content (%) | 35 ± 2 |
| Flash Point (° F., Setaflash) | >200 |

SB-520E35 is a 35% by weight (of the total weight of SB-520E35) moderately functional carboxylic acid containing acrylate oligomer (i.e., aromatic acid acrylate half ester resin) blended in 65% by weight (of the total weight of SB-520E35) of ethoxylated trimethylolpropane triacrylate monomer (designated as SR-454). SB-520E35 is further characterized as indicated below:

| Color, APHA | 150–250 |
| Weight/Gallon (lbs/gal.) | 9.70–9.90 |
| Viscosity (cps) | |
| 25° C. | 80,000–120,000 |
| 40° C. | 40,000–60,000 |
| 60° C. | 3,500–7,000 |
| Acid Number (mg KOH/gm) based on SARBOX ™ Resin Content | 200–230 |
| SARBOX ™ Resin Content (%) | 35 ± 2 |
| Flash Point (° F., Setaflash) | >200 |

Both SB-510E35 and SB-520E35 contain 100% reactive solids. These products are described in SARTOMER COMPANY PRODUCT MANUAL AND APPLICATION GUIDE.

The production ink of the present invention may further comprise a viscosity reducing component and/or a flexibility promoting component. The viscosity reducing component is any low molecular weight reactive diluent that reduces the viscosity of the production ink. Examples of viscosity reducing components (produced and sold by the SARTOMER Company) compatible with the present invention include, but are not limited to, highly propoxylated glyceryl triacrylate (SR-9021), ethoxylated$_3$ trimethylolpropane triacrylate (SR-454), ethoxylated$_6$ trimethylolpropane triacrylate (SR-499), ethoxylated$_9$ trimethylolpropane triacrylate (SR-502), ethoxylated$_{15}$ trimethylolpropane triacrylate (SR-9035), ethoxylated$_{20}$ trimethylolpropane triacrylate (SR-415), pentaerythritol triacrylate (SR-444), propoxylated glyceryl triacrylate (SR-9020), propoxylated$_3$ trimethylolpropane triacrylate (SR-492), propoxylated$_6$ trimethylolpropane triacrylate (SR-501), trimethylolpropane triacrylate (SR-351), trimethylolpropane trimethylacrylate (SR-350), tris(2-hydroxy ethyl) isocyanurate triacrylate (SR-368, SR-368D and SR-290), dipentaerythritol pentaacrylate (SR-399), di-trimethylolpropane tetraacrylate (SR-355), ethoxylated pentaerythritol tetraacrylate (SR-494), pentaacrylate ester (SR-9041), pentaerythritol tetraacrylate (SR-295) and mixtures thereof. The preferred viscosity reducing agent is ethoxylated$_3$ trimethylolpropane triacrylate (SR-454) having a molecular weight of about 428 grams.

Typically, the viscosity reducing component is present from about 10% to about 50% by weight of the total weight of the adhesion promoting component or any value therebetween and, preferably, from about 0.1% to about 37.5%.

The flexibility promoting component compatible with the present invention has a post cure elastic modulus of from about 200 to about 60,000 pounds per square inch, a post cure tensile strength from about 50 to about 2,500 pounds per square inch, a post cure elongation from about 5% to about 350% and a glass transition temperature (i.e., Tg) below about room temperature (e.g., below about 25° C.). The flexibility promoting component includes, but is not limited to, a second acrylate, a ring opening heterocycle and mixtures thereof, wherein the ring opening heterocycle is selected from the group consisting of cyclic esters, cyclic lactones, cyclic sulphides, cyclic acetals, cyclic siloxanes and mixtures thereof. The second acrylate is selected from the group consisting of an aliphatic urethane acrylate, an aromatic urethane acrylate, a polyether acrylate, an acrylated amine, a polybutadiene acrylate, a melamine acrylate and mixtures thereof. The cyclic ester of the flexibility promoting component includes an epoxide.

Additional examples of flexibility promoting components compatible with the present invention include, but are not limited to, urethane acrylate base resins designated by the SARTOMER Company as CN-962, CN-965, CN-966, CN-972, CN-973 and CN-981 and urethane acrylate resin/monomer blends designated as CN-965A80, CN-966A80, CN-966H90, CN-966J75, CN-973A80, CN-973H85, CN-973J75 and CN-981B88 and described in the SARTOMER COMPANY PRODUCT MANUAL AND APPLICATION GUIDE. Of these, CN-962, CN-965 and CN-966 are aliphatic urethane acrylate oligomers having a polyester backbone. CN-973 is an aromatic urethane acrylate having a polyester backbone. CN-972 is an aromatic urethane acrylate having a polyester backbone. CN-981 is an aliphatic urethane acrylate having a polyester backbone. In CN-965A80, CN-966A80, CN-966H90, CN-966J75, CN-973A8, CN-973H85, CN-973J75 and CN-981B88, the CN-966, CN-973 and CN-981 are the base resins, respectively.

The letters A, B, H and J as used in the SARTOMER product designations refer to the monomers blended with the base resins. The number following the monomer letter designation indicates the percent by weight of the base resin, the remainder being the amount of the monomer making up the blend (i.e., totalling 100% by weight). Monomers A, B, H and J correspond to the SARTOMER designations tripropylene glycol diacrylate (SR-306), 1,6-hexanediol diacrylate (SR-238), 2(2-ethoxyethoxy) ethylacrylate (SR-256) and isobornyl acrylate (SR-506), respectively.

The flexibility promoting component is optionally added to the production ink composition in an amount of about 75% by weight or less, typically from about 5–60% by weight or any value therebetween. Preferably, the flexibility promoting component is present from about 10–30% by weight and, most preferably, from about 15–20% by weight.

Additionally, the production ink may optionally contain a solvent in an amount from about 1–30% by weight of the total weight of the ink composition. Examples of solvents compatible with the present invention include, but are not limited to, (Fast Evaporating Rate Solvents): acetone, ethylacetate (85–88%), ethyl acetate (95–98%), ethyl acetate (99%), methyl acetate (80%), methyl ethyl ketone, isopropyl acetate (95–97%), iso-propylether, tetrahydrofuran; (Medium Evaporating Rate Solvents): iso-butyl acetate (90%), n-butyl acetate (90-92%), n-butyl acetate (99%), sec-butyl acetate (90%), sec-butyl alcohol, tert-butyl alcohol, 1,1,1-trichloroethane, ethyl ketone, ethyl alcohol 200 PRF. ANHD, ethyl alcohol 190 PRF. ANHYD, ethyl alcohol 190 PRF. (95%), methyl alcohol, methyl isobutyl ketone, methyl isopropyl ketone, methyl n-propyl ketone, 2-nitropropane, n-propyl acetate (90–92%), iso-propyl alcohol, n-propyl alcohol; (Slow Evaporating Rate Solvents): amyl acetate (ex Fuel Oil) (85–88%), amyl acetate primary (mixed isomers)(95%), amyl alcohol primary (mixed isomers), tert-amyl alcohol, iso-butyl alcohol, n-butyl alcohol, butyl dioxitol™ glycol ether, butyl oxitol™ glycol ether, m-cresol, cyclohexanol, cyclohexanone, diacetone alcohol, dibasic ester, diethylene glycol, diethylene glycol monobutyl ether acetate (95%), diisobutyl ketone, dimethyl formamide, diethylene glycol, monoethyl ether—low gravity, diethylene glycol monoethyl ether—high gravity, dipropylene glycol monomethyl ether, dipropylene glycol monomethyl ether acetate, ethyl butyl ketone, ethyl-3-ethoxy propionate, ethylene glycol, 2-ethyl hexanol, 2-ethyl hexyl acetate (95%), ethylene glycol monoethyl ether acetate (95%), ethylene glycol monoethyl ether acetate (99%), ethylene glycol monobutyl ether acetate, hexylene glycol, isobutyl isobutyrate, isophorone, methyl n-amyl ketone, diethyl glycol monomethyl ether, methyl isoamyl ketone, methyl isobutyl carbinol, ethylene glycol monomethyl ether, n-methyl-2-Pyrrolidone, ethylene glycol monoethyl ether, propylene glycol, propylene glycol monomethyl ether, propylene glycol monomethyl ether acetate, propylene glycol mono tertiary butyl either, triethylene glycol; (Aliphatic Hydrocarbon Solvents): Mineral spirits, naphtha, or mixtures thereof and (Aromatic Hydrocarbon Solvents): Toluene, xylene or mixtures thereof. These solvents may be obtained from the Shell Chemical Company, Exxon (Houston, Tex.) or Eastman Chemical Co., (Kingsport, Tenn.). Additional solvents well known in the art may be used.

Faster evaporating solvents are preferred for higher production rates (i.e., more balls production printed or logo printed per unit time). However, faster evaporating solvents typically yield higher levels of volatile organic compounds (VOCs) per unit time making them susceptible to greater EPA regulation. On the other hand, slower evaporating solvents produce lower VOCs per unit time, but require longer drying times thereby lowering production rates.

The production inks may also optionally contain colorants such as pigments or dyes that are well known to those skilled in the ink formulation art in amounts sufficient to impart a desired color.

The logo ink of the invention differs from the production ink in that it contains different additive components due to differences in performance requirements of logos versus production prints. The logo ink comprises an ink base and at least a toughening agent. A further, optional additive to the logo ink base is a friction reducing agent commonly referred to as a slip and mar agent. For logos, the same ink base as described for the production inks is used, i.e., comprising a prepolymer having at least two prepolymer functional moieties, wherein the prepolymer is a first acrylate, an ester or mixtures thereof and a polymerizable monomer. Further, the ink base contains a photoinitiator. The photoinitiators compatible with logo inks are the same as those compatible (as previously listed) with production inks. Further, the percent by weight amounts of the photoinitiators compatible with production inks are also compatible with logo inks. Thus, for example, the photoinitiator is present in a logo ink from about 0.05% to about 15%, preferably, from about 0.05% to about 5% and, most preferably, from about 0.1% to about 0.5%. Esacurem KIP-100F (at 0.1% by weight of the total weight of the logo ink) is a preferred commercially available photoinitiator that is compatible with the logo ink of the present invention. However, other commerically available photoinitiators may be used.

Suitable toughening agents are sterically hindered acrylates, preferably, monomers, dimers, trimers or oligomers. Further examples of toughening agents compatible with the logo inks of the present invention include, but are not limited to, epoxy acrylate, isobornyl acrylate (SR-506), tetrahydrofurfuryl acrylate, cyclohexyl acrylate, dicyclopentenyl acrylate, dicyclopentenyl oxyethyl acrylate, vinyl toluene (styrene), isobornyl methacrylate, tetrahydrofurfuryl methacrylate, cyclohexyl methacrylate, dicyclopentenyl methacrylate, dicyclopentenyl oxyethyl methacrylate and mixtures thereof. The toughening agents preferably are reactive diluents which increase both the hardness and the flexibility of the ink base to yield a logo ink.

The toughening agent is present typically from about 5–75% by weight, or any value therebetween, of the total weight of the logo ink, preferably, from about 5–30% by weight and, most preferably, from about 10–20% by weight.

In addition to the toughening agent, as noted above, a friction reducing agent may be optionally added to the base ink to form a preferred logo ink. The friction reducing agent minimizes abrasion of the logo ink by sand, dirt and other abrasive materials or surfaces commonly encountered during golfing or during other typical uses of game balls. The friction reducing agent decreases the friction between the logo (i.e., surface printed with the logo ink) and external abrasive materials on contact, thereby minimizing the degradation of the logo. Examples of friction reducing agents compatible with the logo ink of the present invention include, but are not limited to, a solution of polyether modified dimethylpolysiloxane copolymer (BYK™-306; BYK™-341;BYK™-344), polyether modified dimethylpolysiloxane copolymer (BYK™-307; BYK™-333), a solution of acrylic functional, polyester modified dimethylpolysiloxane (BYK™-371), silicon acrylates and mixtures thereof. Of these, the reactive friction reducing agents such as silicon acrylates and acrylic functional, polyester modified dimethylpolysiloxanes (BYK™-371) are preferred because they form bonds and become integrated into the structure of the logo ink upon ultraviolet radiation curing. The BYK T friction reducing agents are listed in the BYK product catalogue and may be obtained from BYK-Chemie USA of Wallingford, Conn. The friction reducing agents (e.g., dimethylpolysiloxanes) can be obtained from various companies such as Dow Corning (Midland, Mich.) and OSI Specialties (Endicott, N.Y.).

The friction reducing agent is present in an amount of about 10% by weight (of the total weight of the logo ink) or less, typically, from about 0.1–10% by weight or any value therebetween, preferably, from about 0.6–4% by weight and, most preferably, from about 1–2% by weight.

The logo ink may further comprise from about 1–50% by weight of solvent, preferably about 30% by weight. Suitable logo ink solvents are the same as those previously listed for use with production inks. It should be noted that certain volatile solvents evaporate to varying degrees. Thus, it is often necessary to continuously or intermittently replenish the volatilized solvent to maintain from about 1–50% of the solvent in the ink composition.

In the case of logo inks, the ink is first deposited, for example, on a golf ball topcoat. Then, the solvent is optionally removed by flashing. Finally, the logo ink is ultraviolet radiation cured. In contrast, the production ink layer is first deposited directly upon the cover surface or primer coat. Then, the solvent is optionally removed by flashing. Thereafter, the ink layer is ultraviolet radiation cured. Finally, overcoats and/or topcoats are applied to the UV cured ink layer to form a production print. Further, during the curing step, to prevent overheating of the ink layers (e.g., production ink layers or logo ink layers), topcoats, overcoats and/or other parts of the substrate (e.g., golf ball) as well as the UV lamps, one or more cooling gases (e.g., circulated by a cooling fan) may be provided to envelope the substrate and to dissipate heat. Such gases should be non-reactive with the substrate, the ink layers, the topcoat, the overcoat and/or other layers, especially during exposure to ultraviolet radiation. Examples of suitable cooling gases include, but are not limited to, the inert gases (e.g., helium, argon etc.), nitrogen, air or mixtures thereof. Other suitable gases are known to those skilled in the art.

It is believed, although applicant is not bound by this theory, that UV exposure ionizes components, for example, within the ink and/or a layer in contact with such ink. Further, without being bound by theory, it is believed that the photoinitiator within the ink formulation absorbs UV radiation and yields reactive intermediates such as free radicals through intermolecular and/or intramolecular interactions. These reactive intermediates increase the cross-linking rate (e.g., photopolymerization rate) of the various components of the inks of the present invention with the substrate layers or articles in contact with such inks. The cross-linking imparts greater durability, intercoat adhesion, abrasion resistance and the like to production prints or logos printed with such inks.

Once the inks are applied and any solvents optionally removed by flashing (e.g., with infrared heat, or held at ambient temperature for 10–30 minutes or heated by forced hot air to a ball surface temperature of about 120° F. or less for about 8–60 seconds), these inks are cured. Curing is carried out rapidly by the novel and cost-effective use of ultraviolet radiation (e.g., on golf balls) as follows.

Ultraviolet radiation is produced from an ultraviolet radiation source. For example, with reference to FIG. 1, in a rudimentary form, the ultraviolet radiation source 10 comprises a power source (e.g., a pair of electrodeless microwave generators 11a and 11b), a reflector 12, an ultraviolet radiation emitting bulb 14 and an optional microwave screen 16 (i.e., a microwave screen is used when the power is provided by an electrodeless microwave power supply). Input power from the power source to the bulb 14 causes the bulb 14 to emit ultraviolet radiation 20 in the visible wavelength range from about 400 to about 450 nanometers and in the ultraviolet wavelength range from about 200 nanometers to about 400 nanometers, preferably, from about 250 nanometers to about 400 nanometers and, more preferably, from about 300 nanometers to about 370 nanometers. A portion of the ultraviolet emissions 20 from the bulb 14 are reflected by the reflector 12 and propagated through the microwave screen 16 towards the focal point 18 situated at a distance L, from bulb 14.

Figure 2:
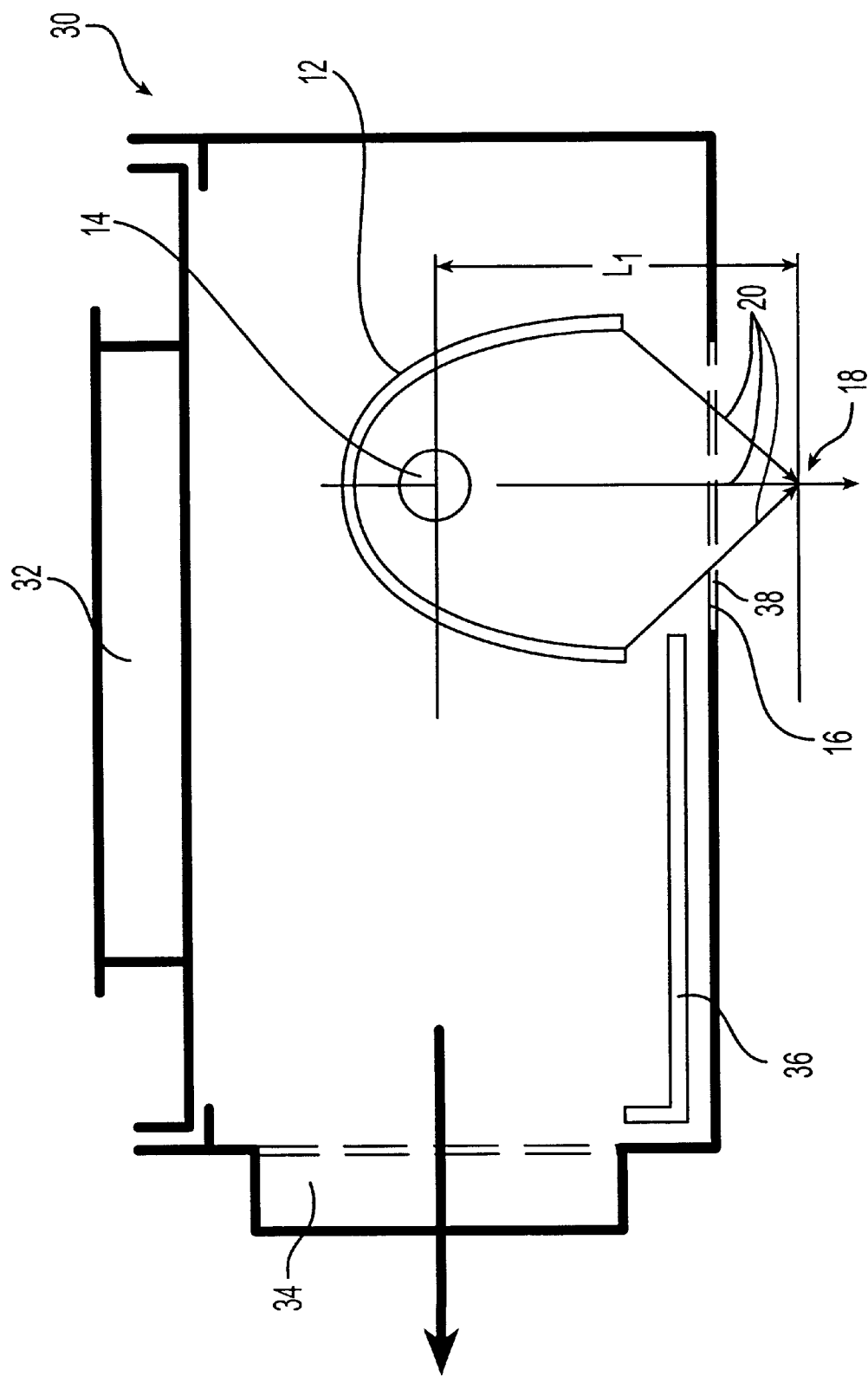
FIGS. 2, 3 and 4 are schematic cross-sectional drawings of other exemplary ultraviolet radiation sources wherein the power supply, though present, is not shown.
Figure 3:
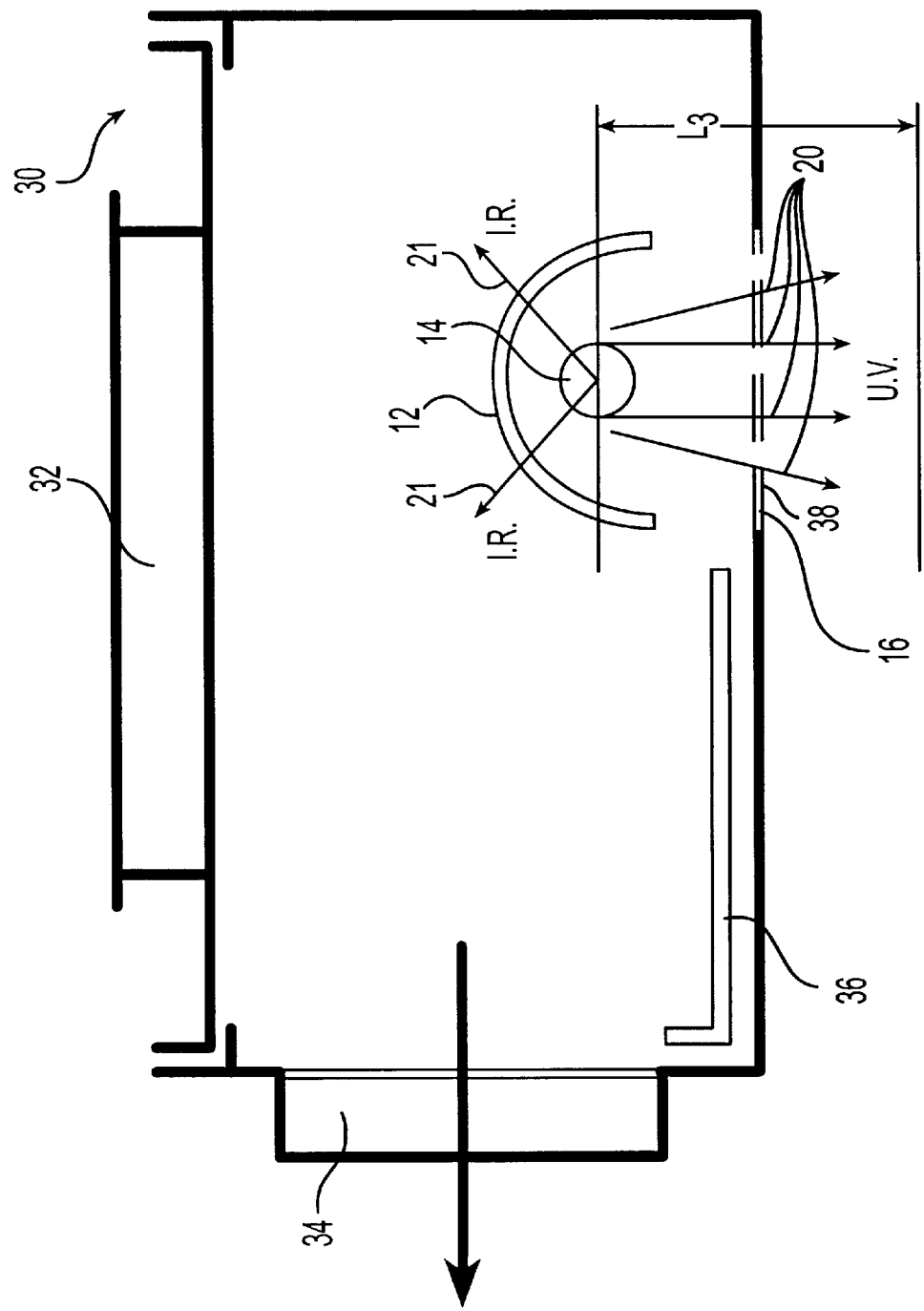
Figure 4:
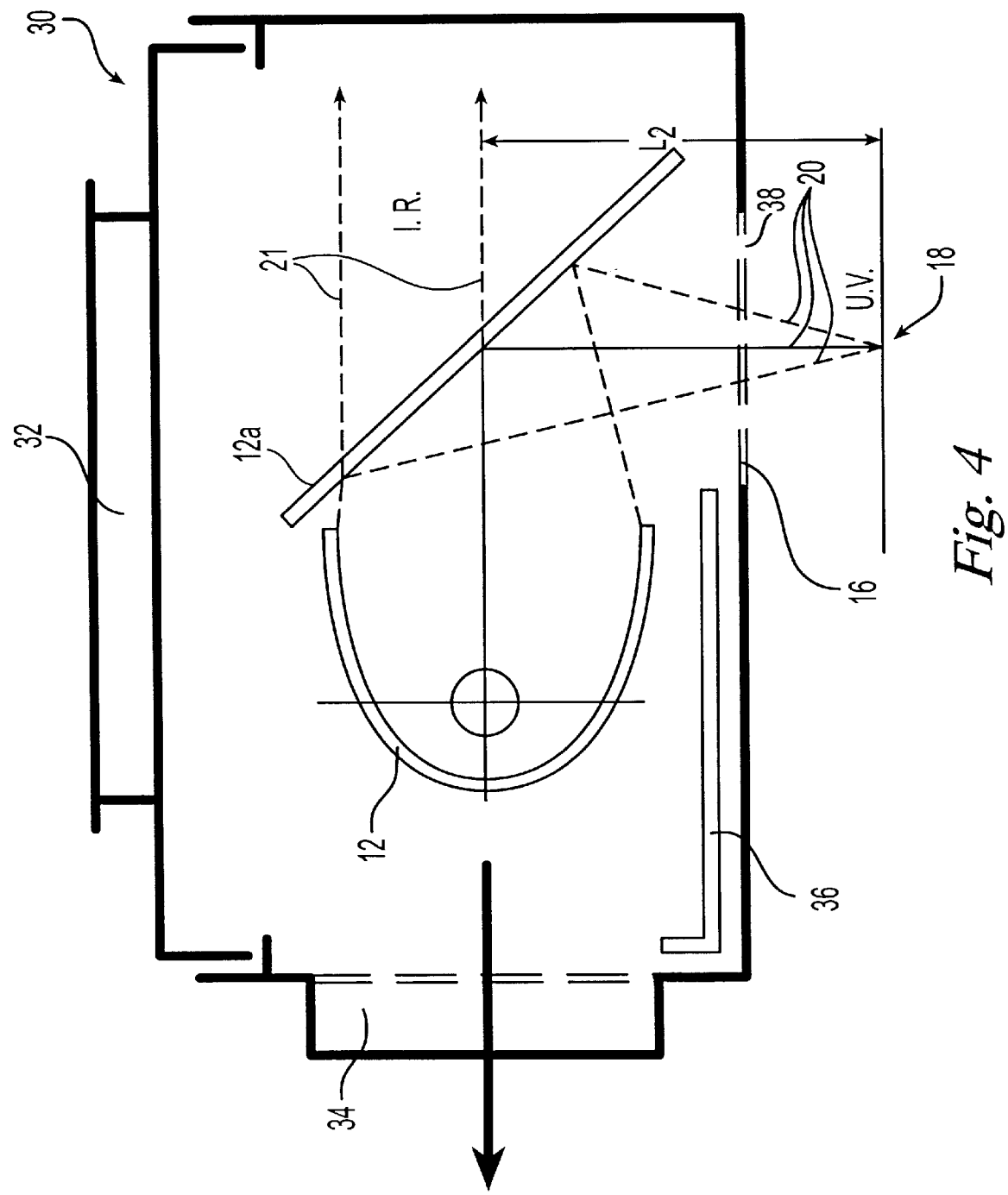

Other examples of ultraviolet radiation sources are depicted in FIGS. 2, 3 and 4. With reference to FIG. 2, a UV chamber 30 is shown containing a reflector 12 (e.g., of elliptical shape), an ultraviolet bulb 14, an optional cooling fan 32, an optional air exhaust outlet 34, an optional shutter 36 and an opening 38 fitted with an optional screen 16 (e.g., microwave screen, etc.). Though not shown in FIGS. 2, 3 and 4, a power supply is provided. The elliptical reflector 12 may be made of a metal such as aluminum, a suitable alloy or a dichroic reflector. The dichroic reflector (e.g., quartz dichroic reflector) is preferred to a metallic reflector because it does not reflect infrared (IR) radiation and, thus, reduces the amount of heat reflected towards a given target 18 (e.g., located at a focal distance $L_1$).

With reference to FIG. 3, the ultraviolet radiation source is the same as that depicted in FIG. 2, except that a semi-cylindrical reflector 12 (e.g., parabolic) is shown instead of the elliptical reflector 12 of FIG. 2. As an example, the reflector 12 of FIG. 3 is a dichroic quartz reflector which produces dispersed ultraviolet output for broad flood exposure. In addition, the dichroic reflector 12 allows IR radiation 21 to pass through it without reflection. This, along with optional cooling fan 32 and optional air exhaust outlet 34, minimizes the heat directed from bulb 14 through opening 38 fitted with an optional screen 16. The heat dissipated out of opening 38 may be reduced by as much as about 50% by using a dichroic reflector instead of a metallic reflector. The object to be irradiated is preferably located at a distance $L_3$ from bulb 14. Typically, $L_3$ is about 5 inches or less, preferably, from about 3 inches to about 5 inches.

FIG. 4 is the same as FIG. 2 except that a second reflector 12a is provided as shown. When an elliptical reflector 12 is combined with a dichroic second reflector 12a (e.g., as depicted in FIG. 4), the ultraviolet radiation source produces a high peak cure zone with about 97% UV efficiency. Further, IR radiation 21 directed through opening 38 is reduced by about 95% for temperature critical applications. The object to be irradiated is preferably located at a distance $L_2$ as depicted. Typically, $L_2$ is about 5 inches or less, preferably, from about 3 inches to about 5 inches.

As one of ordinary skill will appreciate, a focal length exists when the reflector 12 is of an elliptical or circular shape. However, when the reflector 12 has a parabolic shape, the emitted ultraviolet radiation 20 is reflected as parallel radiation waves (i.e., that do not intersect at a focal point). The ink layers to be cured are placed in the path of the ultraviolet radiation 20 emitted from bulb 14. For UV curing, an elliptical reflector is preferred because the ultraviolet radiation is concentrated at the focal point. However, a parabolic reflector may be used. Though not shown in FIG. 1, the game ball surface to be irradiated (e.g., golf ball) is preferably positioned at a distance Li from bulb 14 to expose the inked layers to UV curing radiation 20 at the focal point 18. Alternately, however, the ink layers (e.g., logo ink layers or production ink layers) may be located beyond bulb 14 and beyond optional microwave screen 16 at a distance from about ⅓ to about 10 times the focal length of an elliptical or circular reflector 12. The ink layers are then cured by exposing the ink layers to ultraviolet radiation 20 from bulb 14.

For production inks, the distance $L_1$ from the bulb 14 to the ink layer is about 5 inches or less, typically, from about 3 inches to about 5 inches and, preferably, from about 3.5 inches to about 4 inches. For sufficient cure, an elliptical or a parabolic reflector (i.e., reflective to UV radiation) such as a dichroic coated quartz reflector may be used. The ink is exposed to a dose of the UV radiation sufficient to cure the production ink layers. The UV dosage is, typically, in the range from about 0.4 joules/cm$^2$ to about 10 joules/cm$^2$ and, preferably, from about 1 to about 4.00 joules/cm$^2$. The input power of the UV source should be sufficient to provide a dose sufficient to cure the ink layers without overheating (e.g., above about 120° F.) or otherwise detrimentally effecting the game ball, golf ball or the like.

Production ink layers typically have a thickness of from about 0.3 to about 25 microns. When exposed to UV curing radiation, the ink layers must be cured through the full thickness of the ink layers. Typically, the ink layer to be cured is exposed to UV curing radiation for a residence time (i.e., exposure time to the UV curing radiation) from about 0.25 to about 2.0 seconds, preferably, from about 1 second to about 1.5 seconds. As would be understood by one skilled in the art, if thicker ink layers (e.g., thicker than about 25 microns) are to be cured, then the residence time may need to be increased, the level of photoinitiator may need to be increased, the level of colorant may need to be decreased or some combination thereof.

For logo inks, the distance $L_1$ from the bulb 14 to the ink layer to be cured is about 5 inches or less, typically, from about 3 inches to about 5 inches and, preferably, from about 3.5 inches to about 4 inches. For sufficient cure of logo inks, an elliptical reflector (e.g. polished aluminum reflector that is reflective to UV radiation) is preferred. As with production inks, the logo ink is exposed to a dose of the UV radiation sufficient to cure the logo ink layer. The UV dosage is, typically, in the range from about 0.4 joules/cm$^2$ to about 10 joules/cm$^2$ and, preferably, from about 1 joule/cm$^2$ to about 4 joules/cm$^2$. The input power of the UV irradiating source, the residence time and the ink layer thickness compatible for curing logo inks are the same as those that are compatible for curing production inks described previously.

Ultraviolet radiation sources are well known to those skilled in the art. See, for example, U.S. Pat. No. 4,501,993 (Mueller et al.), U.S. Pat. No. 4,887,008 (Wood), U.S. Pat. No. 4,859,906 (Ury et al.); U.S. Pat. No. 4,485,332 (Ury et al.), U.S. Pat. No. 4,313,969 (Matthews et al.), U.S. Pat. No. 5,300,331 (Schaeffer), U.S. Pat. No. 3,872,349 (Spero et al.), U.S. Pat. No. 4,042,850 (Ury et al.), U.S. Pat. No. 4,507,587 (Wood et al.), U.S. Pat. No. 5,440,137 (Sowers), U.S. Pat. No. 3,983,039 (Eastlund) and U.S. Pat. No. 4,208,587 (Eastlund et al.), each incorporated herein by reference in its entirety. Commercially available UV radiation sources include, but are not limited to, Fusion Model 300 from Fusion Systems Corp. of Rockville, Md., Hönle Model UVA Print 740 (e.g., fitted with a Mercury bulb, a metal halide bulb or another bulb having an output wavelength from about 200 nm to about 450 nm) from Hönle Corp. of Marlboro, Massachusetts and UVEXS models designated as UVEXS Model CCU, UVEXS Model ECU, UVEXS Model SAC, UVEXS Model SACC, UVEXS Model OCU, UVEXS SCU and UVEXS Model 471, available from Ultraviolet Exposure Systems, Inc. of Sunnyvale, Calif.

Having described the invention, the following examples are provided to illustrate specific applications thereof, including the best mode now known to perform the invention. These specific examples are not intended to limit the scope of the invention described herein.

EXAMPLES

Several inks, designated as "A", "B", "C", "D" and "E" (see Tables I and II, infra), were production printed or logo printed on SURLYN® covered golf balls. Inks "A", "B" and "C" refer to production inks while inks "D" and "E" refer to logo inks.

The production inks were pad printed onto roughened SURLYN® golf ball covers to form production prints. After pad printing with inks A, B and C, each of the balls were flashed at ambient temperature for about 10 to 30 minutes to evaporate any solvents present. Thereafter, the inks were UV radiation cured with a Fusion Model 300 UV source using a "D bulb" having a peak power at about 370 nanometers. The "D bulb" is provided by Fusion Systems Corp. While the "D bulb" is preferred, Fusion Systems' "H bulb" or the "V bulb" may be used. Each of these bulbs is a mercury UV irradiating bulb. The residence time for curing was from about 1 second to about 1.25 seconds and the distance from the bulb to the production ink layer was about 4 inches. During UV curing of the production inks, air was fed over the golf ball to keep the ball and ink surfaces cool. After curing, the production ink layers were coated with an overcoat of a water based urethane (e.g., PPG S-24455). Then, the overcoat was topcoated with a 2 part urethane topcoat (e.g., PPG S-24853).

With reference to inks D and E, the logo inks were pad printed onto a topcoat layer (PPG S-24853) deposited over a water based urethane (PPG S-24455) on a SURLYN® cover golf ball. Thereafter, the ink layers were flashed at ambient temperature from about 10 to about 30 minutes to evaporate any solvents therein (i.e., in the logo inks "D" and "E"). The logo inks were then UV cured with a Fusion Systems Model 300 UV source under the same conditions used with respect to the production ink layers previously described.

These pad printed balls (i.e. production printed and logo printed) were then tested as indicated below. The test results are provided in Table III, infra.

For a production ink or a logo ink to have sufficient adhesion (e.g., for production ink—intercoat adhesion to a golf ball cover or primer coat and adhesion to a topcoat or overcoat after UV radiation curing; for logo ink—adhesion to topcoat after UV radiation curing) in accordance with the present invention, the production ink or logo ink should exhibit adhesion to at least about 75% of the inked surface.

Adhesion of production inks and logo inks is measured by several methods. A first method involves abrasion testing wherein production or logo inked golf balls are tumbled for about three hours (to determine the effect on adhesion) as indicated below.

Tumble Test (Adhesion Test) on Coating Durability

A tumble test was designed to gauge abrasion/scuff resistance to duplicate the wear and abrasion characteristics of range golf balls. The test utilizes E252 Alundum (granule size SM8) and small marble chips as the tumble media.

Operating Procedure

Step 1. Using a cast aluminum scoop, place 2 level scoops of E252 Alundum (granule size SM8) and 2 level scoops of small marble chips into a ball mill.
Note: 1 scoop of Alundum weighs about 1.78 pounds. 1 scoop of small marble chips weighs about 1.71 pounds.

Step 2. Place total of 24 balls (test balls and control balls, if any) into the ball mill.
Note: It is recommended that each group consists of 6 balls.

Step 3. Add two more level scoops of Alundum and marble chips into the ball mill (over the balls).

Step 4. Lock the ball mill lid.

Step 5. Position the ball mill sideways on a rotation device (e.g., manufactured by Norton).

Step 6. Turn the rotation device power "ON".

Step 7. Tumble the balls continuously for 3 hours at about 60 revolutions per minute (i.e., of the rotation device).

Step 8. At the end of 3 hours, turn the rotation device off.

Step 9. Remove the ball mill from the rotation device. Place the ball mill right side up (i.e., upright) on the floor.

Step 10. Unlock the ball mill lid.

Step 11. Pick out the 24 balls from the ball mill.

Step 12. Using a Nessler tube brush, rinse and brush the balls under a water faucet. Add soap and scrub with a brush.

Step 13. Dry the balls with towels. Divide them into their respective groups.

Step 14. Visually examine the ink durability of the test balls.

A second test involves subjecting UV cured production inked and logo inked golf balls to a number (e.g., 100, 200, 500 etc.) of random collisions with a non-elastic surface (e.g., a grooved steel plate) at a high speed (e.g., about 90 miles per hour). Preferably, the speed of the non-elastic surface is at least about 90 miles per hour upon impact with the ball.

A third test involves conducting a tape adhesion test such as ASTM test D-3359-87 (Method B) as applied to UV cured production ink and UV cured logo ink images, for example, on a golf ball. After each test, the inked golf balls were visually inspected to determine the integrity of the inked image tested. Table I below indicates the production ink compositions tested. Table II below indicates the logo ink compositions tested. The results of these tests are indicated in Table III below.

TABLE I

| | Production Ink Composition | | |
|---|---|---|---|
| | Unmodified Production Ink A | Unmodified Production Ink B | Unmodified Production Ink C |
| Ink Base Composition | Gotham Ink ® (Black Ink Formula 43770; Product Code 9241), a nitrocellulose based stock ink containing carbon black | Trans-tech UVA ® Carbon Black Ink with 65% by weight solids containing stock carbon black and stock photoinitiator | Trans-tech UVA ® Carbon Black Ink with 65% by weight solids containing stock carbon black and stock photoinitiator |
| Adhesion Promoting Component | — | — | SB0520E35 - 10% by weight |
| Flexibility Promoting Component | — | — | CN-966H90 - 20% by weight |
| Photoinitiator | — | Stock photoinitiator as provided in Stock Trans-tech UVA ® Carbon Black Ink with 65% solids | Stock photoinitiator as provided in Trans-tech UVA ® Carbon Black Ink with 65% solids plus KIP-100F - 0.1% by weight |
| Colorant | Stock Carbon Black as provided in Gotham Ink ® Formula 43770 | Stock Carbon Black as provided in Trans-tech UVA ® Carbon Black Ink with 65% solids | Stock Carbon Black as provided in Trans-tech UVA ® Carbon Black Ink with 65% solids |
| Solvent | Stock solvent as provided in Gotham Ink ® Formula 43770 | Stock solvent as provided in Trans-tech UVA ® Carbon Black Ink with 65% solids | Ethyl-3-ethoxy propionate - 5% by weight |

TABLE II

| | Logo Ink Composition | | | |
|---|---|---|---|---|
| | Unmodified Logo Ink D | Modified Logo Ink E | Modified Logo Ink F | Unmodified Logo Ink G |
| Ink Base Composition | Marabu ™ - Two Pack Urethane (TPU) Series Black Ink | Trans-tech UVA Carbon Black Ink with 65% solids containing stock Carbon Black and stock photoinitiator | Trans-tech UVA Carbon Black Ink with 65% solids containing stock Carbon Black and stock photoinitiator | Trans-tech UVA Carbon Black Ink with 65% solids containing stock Carbon Black and stock photoinitiator |
| Toughening Agent | — | SR-506 - 20% by weight | SR-506 - 20% by weight | — |
| Sip & Mar Agent | — | BYK-371 - 2% by weight | — | — |
| Photoinitiator | — | Stock photoinitiator as provided in Stock Trans-tech UVA Carbon Black Ink with 65% solids | Stock photoinitiator as provided in Stock Trans-tech UVA Carbon Black Ink with 65% solids | Stock photoinitiator as provided in Stock Trans-tech UVA Carbon Black Ink with 65% solids |
| Colorant | Stock Carbon Black as provided in Marabu ™ - TPU Series Black Ink | Stock Carbon Black as provided in Trans-tech UVA Carbon Black Ink with 65% solids | Stock Carbon Black as provided in Trans-tech UVA Carbon Black Ink with 65% solids | Stock Carbon Black as provided in Trans-tech UVA Carbon Black Ink with 65% solids |
| Solvent | Stock solvent as provided in Marabu ™ - TPU Series Black Ink | Ethyl-3-ethoxy propionate - 13% by weight | Ethyl-3-ethoxy propionate - 13% by weight | Ethyl-3-ethoxy propionate - 13% by weight |

TABLE III

Test Results of Ink Images

| | Unmodified Production Ink A | Unmodified Production Ink B | Modified Production Ink C | Unmodified Logo Ink D | Modified Logo Ink E | Modified Logo Ink F | Unmodified Logo Ink G |
|---|---|---|---|---|---|---|---|
| Tape Adhesion Test[1,2] | 0B | — | 5B | 5B | 5B | 5B | 5B |
| Tumble Test[2] | 1 | — | 9 | 3 | 9 | 6 | 6 |
| 200 Hit Test[3,2] | 1 | 1 | 10 | 3 | 10 | 8 | 5 |
| 500 Hit Test[4] | — | — | — | — | — | — | — |
| % of Inked Surface Image Integrity Loss by 200 Hit Test | 85–90% | 95% (note topcoat adhesion loss) | 0% | 50% | 5% | 10% | 20% |
| Cover Polymer | Surlyn ™ | Surlyn ™ | Surlyn ™ | Surlyn ™ | Surlyn ™ | Surlyn ™ | Surlyn ™ |
| Undercoat Composition | Water based urethane (PPG S-24455 from Pittsburgh Plate & Glass Co.) | Water based urethane (PPG S-24455 from Pittsburgh Plate & Glass Co.) | Water based urethane (PPG S-24455 from Pittsburgh Plate & Glass Co.) | Water based urethane (PPG S-24455 from Pittsburgh Plate & Glass Co.) | Water based urethane (PPG S-24455 from Pittsburgh Plate & Glass Co.) | Water based urethane (PPG S-24455 from Pittsburgh Plate & Glass Co.) | Water based urethane (PPG S-24455 from Pittsburgh Plate & Glass Co.) |
| Top Coat Composition | PPG S-24853 | PPG S-24853 | PPG S-24853 | PPG S-24853 | PPG S-24853 | PPG S-24853 | PPG S-24853 |

[1]ASTM D3359-87 (Method B); OB = >65% degradation, 1B = 50% degradation, 2B = 40% degradation, 3B = 30% degradation, 4B = 10% degradation, 5B = 0% degradation
[2]Test results are indicated on a numerical scale of 1–10 wherein
1 = severe image degradation
3 = nearly severe image degradation
5 = moderate image degradation
7 = nearly moderate image degradation
9 = minimal image degradation
10 = no visible image degradation
Production ink balls were randomly hit with a golf club at about 90 miles per hour--200 times.
Production ink balls were randomly hit with a golf club at about 90 miles per hour--500 times.

As indicated in Table III, both modified production ink C and modified logo ink E showed no image degradation from the Tape Adhesion Test. Likewise, the tumble test left the production and logo prints (i.e., modified inks C and E, respectively) on the golf balls with minimal image degradation. Further, with the 200 Hit Test, the production prints and logo prints of modified inks C and E, respectively, exhibited minimal image degradation. As a result of the 200 Hit Test, less than 10% of the logo print image (i.e., modified ink E) integrity was lost while no loss of production print image (i.e., modified ink C) integrity was observed. The test results for the unmodified inks A, B and D were not nearly as good as is apparent from Table III.

What is claimed is:

1. An ultraviolet radiation curable water-insoluble production ink for forming an inked surface on at least a portion of a surface of a ball, at least said inked surface thereafter being coated with a topcoat, said ink comprising:
    (a) a prepolymer having at least two prepolymer functional moieties, said prepolymer being selected from the group consisting of a first acrylated prepolymer, an unsaturated ester, and mixtures thereof,
    (b) a monomer polymerizable with the prepolymer;
    (c) a photoinitiator; and
    (d) an adhesion promoting component, wherein said adhesion promoting component is selected from the group consisting of a carboxylic acid functional monomer, a carboxylic acid functional oligomer, and mixtures thereof, wherein said adhesion promoting functional moiety comprises at least about 2 moles of a carbonyl functionality per mole of said adhesion promoting component, and wherein said component being sufficient to maintain adhesion of at least about 75% of said inked surface to said topcoat and to said ball surface upon ultraviolet radiation curing said ink and after coating said ink with said topcoat.

2. The production ink of claim 1 wherein said photoinitiator is a free radical photoinitiator.

3. The production ink of claim 1 wherein said photoinitiator is selected from the group consisting of oligo(2-hydroxy-2-methyl-1-(4-(1-methylvinyl)phenyl)propanone), 2-hydroxy-2-methyl-1-phenyl-1-propanone, 2,4,6-trimethylbenzophenone, 4-methylbenzophenone, 2,2-dimethoxy-1,2-diphenylethanone, 2-butoxy-1,2-diphenylethanone, 2-(2-methylpropoxy)-1,2-diphenylethanone, benzophenone, 2-alpha hydroxy ketone and mixtures thereof.

4. The production ink of claim 3 wherein said ink is applied to a golf ball, wherein adhesion of said ink is maintained after said golf ball having said cured inked surface is subjected to at least about 100 random collisions with a non-elastic surface at least at about 90 miles per hour and wherein said photoinitiator is present in an amount sufficient to cure said ink upon exposure to said ultraviolet radiation.

5. The production ink of claim 3 wherein said adhesion promoting component is selected from the group consisting of an acrylate oligomer, an aromatic acid acrylate ester, an aromatic acid methacrylate ester and mixtures thereof and wherein said photoinitiator is present in an amount from about 0.05% to about 15% by weight based on a total weight of said production ink.

6. The production ink of claim 5 wherein said adhesion promoting functional moiety comprises between about 3 to about 12 moles of said carbonyl functionality per mole of said adhesion promoting component and wherein said photoinitiator is present in an amount from about 0.1% to about 0.5% by weight based on said total weight.

7. The production ink of claim 6 wherein said adhesion promoting functional moiety is selected from the group consisting of a carboxylic acid, an ester, an anhydride and mixtures thereof, wherein said photoinitiator is a mixture of olgo(2-hydroxy-2-methyl-1-(4-(1-methylvinyl)phenyl) propanone) and 2-hydroxy-2-methyl-1-phenyl-1-propanone and wherein said photoinitiator is present in said amount of about 0.1% by weight based on said total weight.

8. The production ink of claim 7 wherein said ink further comprises a viscosity reducing component having a molecular weight from about 100 grams per mole to about 1000 grams per mole and is selected from the group consisting of acrylate monomers, acrylate oligomers and mixtures thereof.

9. The production ink of claim 8 wherein said viscosity reducing agent is present in an amount from about 10 to about 50 percent by weight of the total weight of said adhesion promoting component.

10. The production ink of claim 9 wherein said ink is applied to a golf ball and wherein said golf ball comprises a cover made from a polymer selected from the group consisting of an ionomer, balata, a polyurethane, a polyolefin and mixtures thereof.

11. The production ink of claim 10 wherein said adhesion promoting functional moiety is a carboxylic acid and wherein said adhesion promoting component has a carboxylic acid number of at least about 100.

12. The production ink of claim 11 wherein said carboxylic acid number is from about 100 to about 300 and wherein said adhesion promoting component is present in an amount from about 5 to about 25% by weight of said total weight.

13. The production ink of claim 12 wherein said ink further comprises a flexibility promoting component having a post cure elastic modulus in an amount from about 200 to about 60,000 pounds per square inch and a post cure elongation in an amount from about 5 to about 350%.

14. The production ink of claim 13 wherein said flexibility promoting component is selected from the group consisting of a second acrylate, a ring opening heterocycle and mixtures thereof and wherein said ring opening heterocycle is selected from the group consisting of cyclic ethers, cyclic lactones, cyclic sulphides, cyclic acetals, cyclic siloxanes and mixtures thereof.

15. The production ink of claim 14 wherein said second acrylate is selected from the group consisting of aliphatic acrylates, aromatic acrylates and mixtures thereof.

16. The ultraviolet radiation curable water-insoluble production ink of claim 1 wherein the adhesion promoting component comprises one or more of a carboxylic acid terminated acrylate oligomer, an aromatic acid acrylate ester, an aromatic acid acrylate half ester, an aromatic acid methacrylate ester, and an aromatic acid methacrylate half ester.

17. An ultraviolet radiation curable water-insoluble logo ink for forming an inked surface on at least a portion of a topcoated surface of a ball, said ink comprising,:
    (a) a prepolymer having at least two prepolymer functional moieties, said prepolymer being selected from the group consisting of a first acrylated prepolymer, an unsaturated ester, and mixtures thereof;
    (b) a monomer polymerizable with the prepolymer;
    (c) a photoinitiator;
    (d) a toughening agent, wherein said toughening agent a sterically hindered acrylate being sufficient to maintain adhesion of said ink to said topcoat of at least about 75% of said inked surface after ultraviolet radiation curing; and
    (e) a friction reducing, agent.

18. The logo ink of claim 17 wherein said toughening agent is selected from the group consisting of an epoxy acrylate, isobornyl acrylate, tetrahydrofurfuryl acrylate, dicyclopentenyl oxyethyl acrylate, vinyl toluene, isobornyl methacrylate, tetrahydrofurfuryl methacrylate, cyclohexyl methacrylate, dicyclopentenyl methacrylate, dicyclopentenyl oxyethyl methacrylate and mixtures thereof, wherein said photoinitiator is a free radical photoinitiator present in an amount sufficient to cure said ink upon exposure to ultraviolet radiation, and wherein said toughening agent is present in an amount sufficient so that after said ball is cured and the ball with the inked surface is subjected to at least about 200 random collisions with a non-elastic surface at an impact speed of at least about 90 miles per hour the amount of logo ink lost is no greater than about 10%.

19. The logo ink of claim 18 wherein said toughening agent is present in an amount from about 5–75% by weight of said ink and wherein said photoinitiator is selected from the group consisting of oligo(2-hydroxy-2-methyl-1-(4-(1-methylvinyl)phenyl)propanone), 2-hydroxy-2-methyl-1-phenyl-1-propanone, 2,4,6-trimethylbenzophenone, 4-methylbenzophenone, 2,2-dimethoxy-1,2-diphenylethanone, 2-butoxy-1,2-diphenylethanone, 2-(2-methyl propoxy)-1,2-diphenylethanone, benzophenone, 2-alpha hydroxy ketone and mixtures thereof.

20. The logo ink of claim 17 wherein said photoinitiator is present in an amount from about 0.05% to about 15% by weight based on a total weight of said production ink.

21. The logo ink of claim 20 wherein said friction reducing agent is selected from the group consisting of a dimethylpolysiloxane, a silicon acrylate and mixtures thereof and wherein said photoinitiator is present in an amount from about 0.1% to about 0.5% by weight based on said total weight.

22. The logo ink of claim 21 wherein said friction reducing agent is present in an amount from about 0.1–10% by weight of said total weight, wherein said photoinitiator is a mixture of oligo(2-hydroxy-2-methyl-1-(4-(1-ethylvinyl) phenyl)propanone) and 2-hydroxy-2-methyl-1-phenyl-1-propanone and wherein said photoinitiator is present in said amount of about 0.1% by weight based on said total weight.

23. The logo ink of claim 22 further comprising a solvent and a colorant.

24. The logo ink of claim 23 wherein said colorant is a pigment or a dye.

25. A golfball with a production print comprising:
    a golf ball having a surface;
    a layer of an ultraviolet cured water-insoluble production ink coating at least a portion of said surface, said production ink comprising:
        a prepolymer having at least two prepolymer functional moieties, wherein said prepolymer is selected from the group consisting of a first acrylated prepolymer, an unsaturated ester, and mixtures thereof,
        a monomer polymerizable with the prepolymer;
        a photoinitiator; and
        an adhesion promoting component selected from the group consisting of a carboxylic acid functional monomer, a carboxylic acid functional oligomer, and mixtures thereof, said adhesion promoting component having at least one adhesion promoting functional moiety comprising at least about 2 moles of a carbonyl functionality per mole of said adhesion promoting component; and
    c) a topcoat applied to the at least a portion of the inked surface, wherein said production ink has been cured with ultraviolet radiation, and the cured ink surface maintains adhesion of at least about 75% of said inked surface to said surface of said golf ball and to said topcoat after ultraviolet radiation curing and after said production ink with said topcoat.

26. A golf ball with a logo on at least a portion of a topcoated surface comprising:

a golf ball having a topcoated surface disposed thereon;

an ultraviolet cured water-insoluble logo ink on at least a portion of the topcoated surface, said logo ink comprising:

a prepolymer having two prepolymer function moieties, wherein said prepolymer is selected from the group consisting of a first acrylated prepolymer, an unsaturated ester, and mixtures thereof;

a polymerizable monomer;

a photoinitiator; and a toughening agent, wherein said toughening agent comprises a sterically hindered acrylate said toughening agent being sufficient to maintain adhesion of said ink to said topcoat of at least about 75% of said inked surface after ultraviolet radiation curing.

27. The golf ball of claim 26 wherein said toughening agent is selected from the group consisting of an epoxy acrylate, isobornyl acrylate, tetrahydrofurfuryl acrylate, dicyclopentenyl oxyethyl acrylate, vinyl toluene, isobornyl methacrylate, tetrahydrofurfuryl methacrylate, cyclohexyl methacrylate, dicyclopentenyl methacrylate, dicyclopentenyl oxyethyl methacrylate, and mixtures thereof, wherein said photoinitiator is a free radical photoinitiator present in an amount sufficient to cure said ink upon exposure to ultraviolet radiation, and wherein said toughening agent is present in an amount sufficient so that after said golf ball is cured and the ball with the inked surface is subjected to at least about 200 random collisions with a non-elastic surface at an impact speed of at least about 90 miles per hour the amount of logo ink lost is no greater than about 10%.

28. The golf ball of claim 26 wherein the logo ink further comprises a friction reducing agent.

* * * * *